United States Patent [19]

Ishimaru et al.

[11] Patent Number: 5,008,356
[45] Date of Patent: Apr. 16, 1991

[54] CYCLO-OLEFINIC RANDOM COPOLYMER, OLEFINIC RANDOM COPOLYMER, AND PROCESS FOR PRODUCING CYCLO-OLEFINIC RANDOM COPOLYMERS

[75] Inventors: Naoshi Ishimaru, Yamaguchi; Toshiyuki Tsutsui, Ohtake; Akinori Toyota; Norio Kashiwa, both of Iwakuni, all of Japan

[73] Assignee: Mitsui Petrochemical Industries, Ltd., Tokyo, Japan

[21] Appl. No.: 359,131

[22] Filed: May 31, 1989

Related U.S. Application Data

[62] Division of Ser. No. 162,200, Feb. 29, 1988.

[30] Foreign Application Priority Data

| Mar. 2, 1987 | [JP] | Japan | 62-45152 |
| Dec. 11, 1987 | [JP] | Japan | 62-312112 |
| Dec. 15, 1987 | [JP] | Japan | 62-315206 |
| Feb. 1, 1988 | [JP] | Japan | 63-19622 |

[51] Int. Cl.$^5$ ............................................. C08F 10/00
[52] U.S. Cl. ................................. 526/281; 526/160; 502/154
[58] Field of Search ............... 526/281, 160; 502/154

[56] References Cited

U.S. PATENT DOCUMENTS

| 3,242,099 | 3/1966 | Manyik et al. | 252/429 |
| 3,478,002 | 11/1969 | Nakaguchi et al. | 260/79.5 |
| 4,614,778 | 9/1986 | Kajiura et al. | 526/281 |
| 4,701,432 | 10/1987 | Welborne, Jr. | 502/113 |
| 4,769,510 | 9/1985 | Kaminsky et al. | 526/160 |

FOREIGN PATENT DOCUMENTS

221206 8/1986 Japan .

Primary Examiner—Joseph L. Schofer
Assistant Examiner—Alex H. Walker
Attorney, Agent, or Firm—Sherman and Shalloway

[57] ABSTRACT

A cyclo-olefinic random copolymer composed of an alpha-olefin component having 3 to 20 carbon atoms and a cyclo-olefin component, (i) said copolymer containing 5 to 99 mole % of recurring units derived from said alpha-olefin component having 3 to 20 carbon atoms and 1 to 95 mole % of recurring units derived from said cyclo-olefin component, and (ii) said copolymer having an intrinsic viscosity [$\eta$], measured in decalin at 135° C., of from 0.01 to 10 dl/g; and an olefinic random copolymer composed of (A) an olefin component having 3 to 20 carbon atoms and (B) a cyclic polyene component and as required, (C) a cyclo-olefin component, (i) said copolymer containing 5 to 99 mole % of recurring units derived from said alpha-olefin component (A) having 3 to 20 carbon atoms and 1 to 95 mole % of recurring units derived from said cyclic polyene component (B) and 0 to 90 mole % of recurring units derived from said cyclo-olefin component (C), and (ii) said copolymer having an intrinsic viscosity [$\eta$], measured in decalin at 135° C., of from 0.01 to 10 dl/g; and a process for production thereof. Also provided is a process for producing a cyclo-olefinic random copolymer, which comprises copolymerizing an alpha-olefin and a cyclo-olefin in the presence of a catalyst formed from (A) a compound of a transition metal of Group IVB of the periodic table having as a ligand a multidentate coordination compound in which at least two conjugated cycloalkadienyl groups or substituted products thereof are bonded via a lower alkylene group, and
(B) an aluminoxane.

9 Claims, No Drawings

CYCLO-OLEFINIC RANDOM COPOLYMER, OLEFINIC RANDOM COPOLYMER, AND PROCESS FOR PRODUCING CYCLO-OLEFINIC RANDOM COPOLYMERS

This is a division of application Ser. No. 07/162,200, filed Feb. 29, 1988.

BACKGROUND OF THE INVENTION

1. Field of the Invention

This invention relates to a novel cyclo-olefinic random copolymer. More specifically, the invention has for its object the provision of a cyclo-olefinic random copolymer having excellent transparency, thermal stability, heat aging resistance, chemical resistance, solvent resistance, dielectric properties and mechanical properties and a narrow molecular weight distribution and a narrow composition distribution.

This invention also relates to a novel olefinic random copolymer. More specifically, the invention has for its object the provision of an olefinic random copolymer containing a carbon-carbon unsaturated bond in its side chain which has excellent transparency, thermal stability, heat aging resistance, chemical resistance, solvent resistance, dielectric properties and mechanical properties and a narrow molecular weight distribution and a narrow composition distribution.

This invention further relates to a process for producing a cyclo-olefinic random copolymer by copolymerizing an alpha-olefin and a cyclo-olefin in the presence of a highly active polymerization catalyst. More specifically, the invention relates to a process for producing a cyclo-olefinic random copolymer which comprises copolymerizing an alpha-olefin and a cyclo-olefin in the presence of a catalyst comprising a specific transition metal compound and an aluminoxane.

2. Description of the Prior Art

Known processes for producing cyclo-olefinic copolymers by copolymerizing alpha-olefins such as ethylene and cyclo-olefins involve the use of titanium-containing catalysts comprising titanium compounds and organoaluminum compounds or vanadium-containing catalysts comprising vanadium compounds and organoaluminum compounds.

In a copolymerization process using a titanium-containing catalyst, a cyclo-olefin has lower reactivity than an alpha-olefin such as ethylene and the copolymerization efficiency is low. In order, therefore, to expect production of a copolymer of the cyclo-olefin with the alpha-olefin, it is necessary to add the cyclo-olefin in a large quantity to the polymerization system. The presence of a large quantity of the cyclo-olefin reduces the activity of the catalyst and may result in a decrease in the molecular weight of the resulting copolymer. It is difficult therefore to obtain a high-molecular-weight copolymer. Moreover, this process has the defect that side-reactions such as the ring-opening polymerization of the cyclo-olefin tend to occur, and the resulting polymer has a broad molecular weight distribution. On the other hand, in a copolymerization process using a vanadium-containing catalyst, the copolymerization efficiency of the cyclo-olefin is higher than in the case of using the titanium-containing catalyst and the resulting copolymer has a narrow molecular weight distribution. But it has the defect that the polymerization activity is generally very low.

Catalysts comprising transition metal compounds and aluminoxanes are proposed as highly active polymerization catalysts for olefins in, for example, Japanese Laid-Open Patent Publications Nos. 19309/1983, 95292/1984, 35005/1985, 35006/1985, 35007/1985 and 35008/1985. Of these, Japanese Laid-Open Patent Publications Nos. 19309/1983, 35005/1985, 35006/1985, 35007/1985 and 35008/1985 describe that these catalyst systems can be applied to the copolymerization of ethylene with other alpha-olefins. With regard to the production of cyclo-olefinic copolymers, Japanese Laid-Open Patent Publication No. 221206/1986 discloses a catalyst comprising a transition metal compound and an aluminoxane with regard to the production of a copolymer of an alpha-olefin and a cyclo-olefin. This catalyst, however, has low polymerization activity, and is difficult of giving the copolymer in good yields.

It is generally known that by using Ziegler-type catalysts comprising a combination of titanium or vanadium compounds and organoaluminum compounds, binary copolymers of ethylene with cyclo-olefins or ternary copolymers of ethylene, alpha-olefins such as propylene or 1-butene and cyclo-olefins are obtained. However, no example has been known in which an alpha-olefin having 3 to 20 carbon atoms was copolymerized with a cyclo-olefin in the absence of ethylene with a Ziegler-type catalyst. Naturally, no such copolymer has been reported so far.

Polycarbonate, poly(methyl methacrylate) and polyethylene terephthalate have been known as synthetic resins having excellent transparency. For example, polycarbonate is a resin having excellent thermal stability, heat aging resistance and impact strength in addition to excellent transparency, but have the disadvantage of being inferior in chemical resistance and susceptible to attack by strong alkalies. Poly(methyl methacrylate) is susceptible to attack by ethyl acetate, acetone and toluene, is swollen in ether and has low thermal stability. Polyethylene terephthalate has excellent thermal stability and mechanical properties, but is susceptible to attack by strong acids or alkalies and liable to undergo hydrolysis Many polyolefins widely used as general-purpose resins have excellent chemical resistance, solvent resistance and mechanical properties, but poor thermal stability. Moreover, they have poor transparency because of their crystalline nature. Generally, the transparency of polyolefins is improved by adding a nucleating agent and thereby finely dividing their crystalline structure, or by quenching them to stop growth of crystals. The effects of such techniques, however, have not proved to be entirely satisfactory. Rather, the addition of a third component such as a nucleating agent is likely to reduce the inherent excellent properties of the polyolefins. The quenching method requires a large-sized apparatus, and with a reduction in crystallinity, the polyolefins are likely to be degraded in thermal stability and rigidity.

With regard to the copolymerization of ethylene with bulky comonomers, U.S. Pat. No. 2,883,372, for example, discloses a copolymer of ethylene and 2,3-dihydrodicyclopentadiene. This copolymer has an excellent balance between rigidity and transparency, but poor thermal stability because its glass transition temperature is about 100° C. A copolymer of ethylene and 5-ethylidene-2-norbornene has similar defects.

Japanese Patent Publication No. 14910/1971 proposes a homopolymer of 1,4,5,8-dimethano-1,2,3,4,4a,5,8,8a-octahydro-naphthalene. This polymer, however, has poor thermal stability and heat aging resistance.

Japanese Laid-Open Patent Publication No. 127728/1983 proposes a homopolymer of 1,4,5,8-dimethano-1,2,3,4,4a,5,8,8a-octahydronaphthalene or a copolymer of the above cyclo-olefin and a norbornene-type comonomer. It is clear from this patent document that these copolymers are ring-opened polymers. These ring-opened polymers have poor thermal stability and heat aging resistance because they contain an unsaturated bond in the main polymer chain.

Japanese Laid-Open Patent Publications Nos. 168708/1985, 98780/1986, 115912/1986, 115916/1986, 120816/1986, 95906/1986 and 95905/1986 disclose that olefinic random copolymers of ethylene and specific bulky cyclo-olefins have a good balance in thermal stability, heat aging resistance, chemical resistance, solvent resistance, dielectric properties and mechanical properties while having transparency, and exhibit excellent performance in the field of optical materials such as optical memory discs and optical fibers. These copolymers contain ethylene copolymerized therein, and in order to impart good thermal stability, a large amount of a cyclo-olefin must be copolymerized. Reaction of such copolymers with maleic anhydride or the like to impart polar property to these copolymers usually requires the use of peroxides. This causes cleavage of the main chain and results in a reduction in molecular weight. It is desired therefore to provide olefinic random copolymers which in spite of a low cyclo-olefin content, have excellent thermal stability and can be modified without using peroxides.

SUMMARY OF THE INVENTION

It is an object of this invention to provide a novel cyclo-olefinic random copolymer which has excellent transparency, thermal stability, heat aging resistance, chemical resistance, solvent resistance, dielectric properties and mechanical properties and a narrow molecular weight distribution and a narrow composition distribution and which possesses excellent thermal stability even when its cyclo-olefin content is small.

Another object of this invention is to provide a novel olefinic random copolymer which has excellent transparency, thermal stability, heat aging resistance, chemical resistance, solvent resistance, dielectric properties and mechanical properties and a narrow molecular weight distribution and a narrow composition distribution, possesses excellent thermal stability even when its cyclo-olefin content is small, and which has a carbon-carbon unsaturated bond capable of reacting with maleic anhydride or the like in its side chain, and which can be modified easily according to various purposes.

Still another object of this invention is to provide a process for producing a cyclo-olefinic copolymer having a narrow molecular weight distribution with excellent polymerization activity and a high copolymerization efficiency of the cyclo-olefin.

The above objects are achieved in accordance with this invention by a cyclo-olefinic random copolymer composed of an alpha-olefin component having 3 to 20 carbon atoms and a cyclo-olefin component,
(i) said copolymer containing 5 to 99 mole% of recurring units derived from said alpha-olefin component having 3 to 20 carbon atoms and 1 to 95 mole% of recurring units derived from said cyclo-olefin component, and
(ii) said copolymer having an intrinsic viscosity [$\eta$], measured in decalin at 135° C., of from 0.01 to 10 dl/g.

The above objects are also achieved in accordance with this invention by an olefinic random copolymer composed of (A) an olefin component having 3 to 20 carbon atoms and (B) a cyclic polyene component and as required, (C) a cyclo-olefin component,
(i) said copolymer containing 5 to 99 mole% of recurring units derived from said alpha-olefin component (A) having 3 to 20 carbon atoms and 1 to 95 mole% of recurring units derived from said cyclic polyene component (B) and 0 to 90 mole% of recurring units derived from said cyclo-olefin component (C), and
(ii) said copolymer having an intrinsic viscosity [$\eta$], measured in decalin at 135° C., of from 0.01 to 10 dl/g.

The above objects are also achieved in accordance with this invention by a process for producing a cyclo-olefinic random copolymer, which comprises copolymerizing an alpha-olefin and a cyclo-olefin in the presence of a catalyst formed from
(A) a compound of a transition metal of Group IVB of the periodic table having as a ligand a multidentate coordination compound in which at least two conjugated cycloalkadienyl groups or substituted products thereof are bonded via a lower alkylene group, and
(B) an aluminoxane.

DETAILED DESCRIPTION OF THE PREFERRED EMBODIMENTS

The present inventors made investigations for a novel cyclo-olefinic random copolymer which has excellent transparency, thermal stability, heat aging resistance, chemical resistance, solvent resistance, dielectric properties and mechanical properties and a narrow molecular weight distribution and a narrow composition distribution and which possesses excellent thermal stability even when its cyclo-olefin content is small. These investigations have now led to the discovery that a novel cyclo-olefinic random copolymer having the aforesaid properties can be obtained by copolymerizing an alpha-olefin having 3 to 20 carbon atoms with a cyclo-olefin in the presence of a catalyst formed from a zirconium catalyst and an aluminoxane under specific conditions.

According to this invention, there is provided a cyclo-olefinic random copolymer composed of an alpha-olefin component having 3 to 20 carbon atoms and a cyclo-olefin component,
(i) said copolymer containing 5 to 99 mole% of recurring units derived from said alpha-olefin component having 3 to 20 carbon atoms and 1 to 95 mole% of recurring units derived from said cyclo-olefin component, and
(ii) said copolymer having an intrinsic viscosity [$\eta$], measured in decalin at 135° C., of from 0.01 to 10 dl/g.

The cyclo-olefinic random copolymer of this invention is a cyclo-olefinic random copolymer composed of an alpha-olefin component having 3 to 20 carbon atoms and a cyclo-olefin component.

The cyclo-olefin component is a cyclo-olefin represented by the following general formula I), [I], [II] or [III], and in the cyclo-olefinic random copolymer of this invention, the cyclo-olefin component forms a structure represented by the general formula [IV], [V] or [VI].

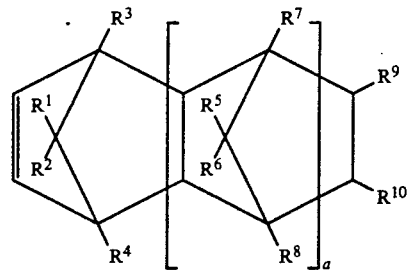

[I]

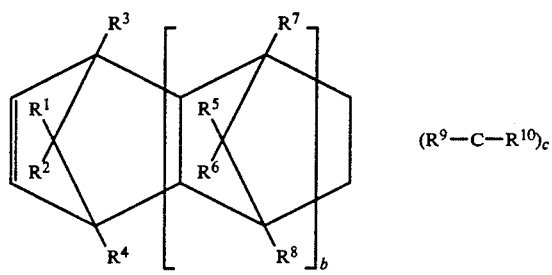

[II]

[III]

$$(R^1-C-R^2)_d$$

In the formulae, a and b are an integer of 0 or more, c and d are an integer of 3 or more, and each of $R^1$ to $R^{10}$ represents a hydrogen atom, a halogen atom or a hydrocarbon atom.

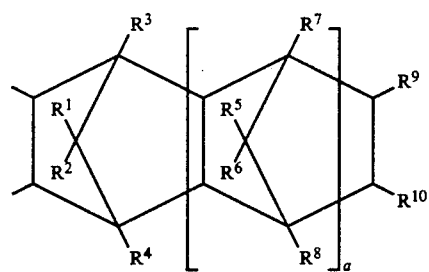

[IV]

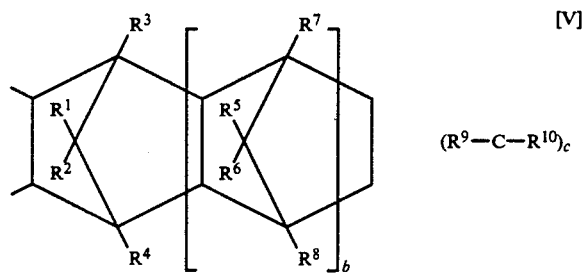

[V]

-continued

[VI]

$$(R^1-C-R^2)_d$$

In the formulae, a, b, c, d, and $R^1$ to $R^{10}$ are as defined above.

In the production of the cyclo-olefinic random copolymer of this invention, examples of the $C_3$–$C_{20}$ alpha-olefin used as a material include propylene, 1-butene, 1-hexene, 4-methyl-1-pentene, 1-octene, 1-decene, 1-dodecene, 1-tetradecene, 1-hexadecene, 1-octadecene and 1-eicosene.

The cyclo-olefin used as another material in the production of the cyclo-olefinic random copolymer of this invention is at least one cyclo-olefin selected from the group of unsaturated monomers represented by general formulae, [I], [II] and [III].

Cyclo-olefins represented by general formula [I] may be easily produced by condensing cyclopentadienes with the corresponding olefins in accordance with the Diels-Alder reaction. Cyclo-olefins represented by general formula [II] can be easily produced likewise by condensing cyclopentadienes with the corresponding cyclo-olefins in accordance with the Diels-Alder reaction.

Specific examples of the cyclo-olefins of general formula [I] include octahydronaphthalenes such as
1,4,5,8-dimethano-1,2,3,4,4a,5,8a-octahydronaphthalene,
2-methyl-1,4,5,8-dimethano-1,2,3,4,4a,5,8,8a-octahydronaphthalene,
2-ethyl-1,4,5,8-dimethano-1,2,3,4,4a,5,8,8a-octahydronaphthalene,
2-propyl-1,4,5,8-dimethano-1,2,3,4,4a,5,8,8a-octahydronaphthalene,
2-hexyl-1,4,5,8-dimethano-1,2,3,4,4a,5,8,8a-octahydronaphthalene,
2-stearyl-1,4,5,8-dimethano-1,2,3,4,4a,5,8,8a-octahydronaphthalene,
2,3-dimethyl-1,4,5,8-dimethano-1,2,3,4,4a,5,8,8a-octahydronaphthalene,
2-methyl-3-ethyl-1,4,5,8-dimethano-1,2,3,4,4a,5,8,8a-octahydronaphthalene,
2-chloro-1,4,5,8-dimethano-1,2,3,4,4a,5,8,8a-octahydronaphthalene,
2-bromo-1,4,5,8-dimethano-1,2,3,4,4a,5,8,8a-octahydronaphthalene,
2,3-dichloro-1,4,5,8-dimethano-1,2,3,4,4a,5,8,8a-octahydronaphthalene,
2-cyclohexyl-1,4,5,8-dimethano-1,2,3,4,4a,5,8,8a-octahydronaphthalene,
2-n-butyl-1,4,5,8-dimethano-1,2,3,4,4a,5,8,8a-octahydronaphthalene, and
2-isobutyl-1,4,5,8-dimethano-1,2,3,4,4a,5,8,8a-octahydronaphthalene, and;
the compounds described in Table 1 below.

TABLE 1

| Chemical formula | Chemical name |
|---|---|
| (bicycloheptene structure with numbered positions 1-7) | bicyclo[2,2,1]hept-2-ene |
| (norbornene with CH₃ at position 6) | 6-methylbicyclo[2,2,1]-hept-2-ene |
| (norbornene with CH₃ groups at positions 5,6) | 5,6-dimethylbicyclo-[2,2,1]-hept-2-ene |
| (norbornene with CH₃ at position 1) | 1-methylbicyclo[2,2,1]-hept-2-ene |
| (norbornene with C₂H₅ at position 6) | 6-ethylbicyclo[2,2,1]-hept-2-ene |
| (norbornene with nC₄H₉ at position 6) | 6-n-butylbicyclo[2,2,1]-hept-2-ene |
| (norbornene with iC₄H₉ at position 6) | 6-i-butylbicyclo[2,2,1]-hept-2-ene |

TABLE 1-continued

| Chemical formula | Chemical name |
|---|---|
| | 7-methylbicyclo[2,2,1]-hept-2-ene |
| | 5,10-dimethyltetracyclo-[4,4,0,1$^{2,5}$,1$^{7,10}$]-3-dodecene |
| | 2,10-dimethyltetracyclo-[4,4,0,1$^{2,5}$,1$^{7,10}$]-3-dodecene |
| | 11,12-dimethyltetra-cyclo-[4,4,0,1$^{2,5}$,1$^{7,10}$]-3-dodecene |
| | 2,7,9-trimethyltetra-cyclo-[4,4,0,1$^{2,5}$,1$^{7,10}$]-3-dodecene |
| | 9-ethyl-2,7-dimethyl-tetra-cyclo [4,4,0,1$^{2,5}$,1$^{7,10}$]-3-dodecene |

TABLE 1-continued

| Chemical formula | Chemical name |
|---|---|
| (structure with CH₃ and CH₂CH(CH₃)₂ substituents) | 9-isobutyl-2,7-dimethyl-tetra-cyclo[4,4,0,1$^{2,5}$,1$^{7,10}$]-3-dodecene |
| (structure with three CH₃ groups) | 9,11,12-trimethyltetra-cyclo-[4,4,0,1$^{2,5}$,1$^{7,10}$]-3-dodecene |
| (structure with two CH₃ and C₂H₅) | 9-ethyl-11,12-dimethyl-tetra-cyclo[4,4,0,1$^{2,5}$,1$^{7,10}$]-3-dodecene |
| (structure with two CH₃ and CH₂CH(CH₃)₂) | 9-isobutyl-11,12-dimethyl-3-tetracyclo[4,4,0,1$^{2,5}$,1$^{7,10}$]-3-dodecene |
| (structure with four CH₃ groups) | 5,8,9,10-tetramethyl-tetra-cyclo[4,4,0,1$^{2,5}$,1$^{7,10}$]-3-dodecene |
| (numbered hexacyclic structure, positions 1-14) | hexacyclo[6,6,1,1$^{3,6}$,1$^{10,13}$,0$^{2,7}$,0$^{9,14}$]-4-heptadecene |
| (hexacyclic structure with CH₃) | 12-methylhexacyclo[6,6,1,1$^{3,6}$,1$^{10,13}$,0$^{2,7}$,0$^{9,14}$]-4-heptadecene |

TABLE 1-continued

| Chemical formula | Chemical name |
|---|---|
| —C₂H₅ | 12-ethylhexacyclo[6,6,1,1³,⁶,1¹⁰,¹³,0²,⁷,0⁹,¹⁴]-4-heptadecene |
| —CH₂CH(CH₃)₂ | 12-isobutylhexacylco[6,6,1,1³,⁶,1¹⁰,¹³,0²,⁷,0⁹,¹⁴]-4-heptadecene |
| CH₃, CH₂CH(CH₃)₂, CH₃, CH₃ | 1,6,10-trimethyl-12-isobutyl-hexacyclo[6,6,1,1³,⁶,1¹⁰,¹³,0²,⁷,0⁹,¹⁴]-4-heptadecene |
|  | octacyclo-[8,8,1²,⁹,1⁴,⁷,1¹¹,¹⁸,1¹³,¹⁶,0,0³,⁸,0¹²,¹⁷]-5-dococene |
| —CH₃ | 15-methyloctacyclo-[8,8,1²,⁹,1⁴,⁷,1¹¹,¹⁸,1¹³,¹⁶,0,0³,⁸,0¹²,¹⁷]-5-dococene |
| —C₂H₅ | 15-ethyloctacyclo-[8,8,1²,⁹,1⁴,⁷,1¹¹,¹⁸,1¹³,¹⁶,0,0³,⁸,0¹²,¹⁷]-5-dococene |

Specific examples of the cyclo-olefins of general formula [III] are compounds shown in Table 2 below.

TABLE 2

| Chemical formula | Chemical name |
|---|---|
| (structure with numbered positions 1-9) | tricylco[4,3,0,1²,⁵]-3-decene |

TABLE 2-continued

| Chemical formula | Chemical name |
|---|---|
| | 2-methyltricyclo[4,3,0,1$^{2,5}$]-3-decene |
| | 5-methyltricyclo[4,3,0,1$^{2,5}$]-3-decene |
| | tricyclo[4,4,0,1$^{2,5}$]-3-decene |
| | 10-methyltricyclo-[4,4,0,1$^{2,5}$]-3-decene |
| | 1,3-dimethylpentacyclo-[6,6,1,1$^{3,6}$,0$^{2,7}$,0$^{9,14}$]-4-hexadecene |
| | 1,6-dimethylpentacyclo-[6,6,1,1$^{3,6}$,0$^{2,7}$,0$^{9,14}$]-4-hexadecene |
| | 15,16-dimethylpentacyclo-[6,6,1,1$^{3,6}$,0$^{2,7}$,0$^{9,14}$]-4-hexadecene |

TABLE 2-continued

| Chemical formula | Chemical name |
|---|---|
| | pentacyclo[6,5,1,1$^{3,6}$,0$^{2,7}$, 0$^{9,13}$]-4-pentadecene |
| | 1,3-dimethylpentacyclo-[6,5,1,1$^{3,6}$,0$^{2,7}$,0$^{9,13}$]-4-pentadecene |
| | 1,6-dimethylpentacyclo-[6,5,1,1$^{3,6}$,0$^{2,7}$,0$^{9,13}$]-4-pentadecene |
| | 14,15-dimethylpentacyclo-[6,5,1,1$^{3,6}$,0$^{2,7}$,0$^{9,13}$]-4-pentadecene |
| | pentacyclo[6,6,1,1$^{3,6}$,0$^{2,7}$, 0$^{9,14}$]-4-hexadecene |
| | heptacyclo[8,7,1,1$^{2,9}$,1$^{4,7}$, 1$^{11,17}$,0,0$^{3,8}$,0$^{12,16}$]-5-eicosene |
| | pentacyclo[8,8,1$^{2,9}$,1$^{4,7}$, 1$^{11,18}$,0,0$^{3,8}$,0$^{12,17}$]-5-heneicosene |

Specific examples of the cyclo-olefins of general formula [III include cyclopentene, 3-methylcyclopentene, 4-methylcyclopentene, 3,4 dimethylcyclopentene, 3,5- dimethylcyclopentene, 3-chlorocyclopentene, cyclohexene, 3-methylcyclohexene, 4-methylcyclohexene, 3,4-dimethylcyclohexene, 3-chlorocyclohexene and cycloheptene.

The cyclo-olefinic random copolymer of this invention contains 5 to 99 mole%, preferably 15 to 95 mole%, especially preferably 30 to 90 mole%, of recurring units derived from the alpha-olefin component having 3 to 20 carbon atoms, and 1 to 95 mole%, preferably 5 to 85 mole%, especially preferably 10 to 70 mole%, of recurring units derived from the cyclo-olefin component. The recurring units derived from the $C_3$-$C_{20}$ alpha-olefin component and the recurring units derived from the cyclo-olefin component are arranged at random to form a substantially linear cyclo-olefinic random copolymer. That the cyclo-olefinic random copolymer of this invention is substantially linear can be ascertained by the fact that the copolymer completely dissolves in decalin at 135° C.

The intrinsic viscosity [$\eta$], measured in decalin at 135° C., of the cyclo-olefinic random copolymer of this invention is 0.01 to 10 dl/g, preferably 0.05 to 7 dl/g, especially preferably 0.1 to 5 dl/g.

The molecular-weight distribution ($\overline{Mw}/\overline{Mn}$) of the cyclo-olefinic random copolymer of this invention, measured by gel permeation chromatography (GPC), is usually not more than 4, preferably not more than 3.5, especially preferably not more than 3.

The cyclo-olefinic random copolymer of this invention has a glass transition temperature (Tg) of 10° to 240° C., preferably 20° to 200° C.

The cyclo-olefinic random copolymer of this invention can be produced by polymerizing the alpha-olefin having 3 to 20 carbon atoms with a predetermined amount of the cyclo-olefin in the presence of a catalyst formed from (A) a zirconium compound having as a ligand at least two indenyl or substituted indenyl groups or partially hydrogenated groups thereof being bonded via an alkylene group such as an ethylene group, and
(B) an aluminoxane.

The zirconium compound may have at least two indenyl or substituted indenyl groups or partially hydrogenated groups thereof, preferably two indenyl groups, two substituted indenyl groups, or two partially hydrogenated groups thereof.

Specific examples of the above zirconium compound include
ethylenebis(indenyl)zirconium dichloride,
ethylenebis(indenyl)zirconium monochloride monohydride,
ethylenebis(indenyl)ethoxyzirconium chloride,
ethylenebis(4,5,6,7-tetrahydro-1-indenyl)ethoxyzirconium chloride,
ethylenebis(indenyl)dimethylzirconium,
ethylenebis(indenyl)diethylzirconium,
ethylenebis(indenyl)diphenylzirconium,
ethylenebis(indenyl)dibenzylzirconium,
ethylenebis(indenyl)methylzirconium monobromide,
ethylenebis(indenyl)ethylzirconium monochloride,
ethylenebis(indenyl)benzylzirconium monochloride,
ethylenebis(indenyl)methylzirconium monochloride,
ethylenebis(indenyl)zirconium dichloride,
ethylenebis(indenyl)zirconium dibromide,
ethylenebis(4,5,6,7-tetrahydro-1-indenyl)dimethylzirconium,
ethylenebis(4,5,6,7-tetrahydro-1-indenyl)ethylzirconium ethoxide,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride,
ethylenebis(4,7-dimethoxy-1-indenyl)zirconium dichloride,
ethylenebis(indenyl)zirconium dimethoxide,
ethylenebis(indenyl)zirconium diethoxide,
ethylenebis(indenyl)methoxyzirconium chloride,
ethylenebis(indenyl)ethoxyzirconium chloride,
ethylenebis(indenyl)methylzirconium ethoxide,
ethylenebis(4,5,6,7-tetrahydro-1-indenyl)zirconium dimethoxide,
ethylenebis(4,5,6,7-tetrahydro-1-indenyl)zirconium diethoxide,
ethylenebis(4,5,6,7-tetrahydro-1-indenyl)methoxyzirconium chloride,
ethylenebis(4,5,6,7-tetrahydro-1-indenyl)methylenebis(indenyl)methylzirconium ethoxide,
methylenebis(indenyl)ziroconiumdichloride,
methylenebis(indenyl)dimethylzirconium,
methylenebis(4,5,6,7-tetrahydro-1-indenyl)zirconium dichloride,
propylenebis(indenyl)zirconium dichloride,
propylenebis(indenyl)dimethylzirconium, and
propylenebis(4,5,6,7-tetrahydro-1-indenyl)zirconium dichloride.

The aluminoxane used as component (b) of the catalyst may be, for example, an organoaluminum compound represented by the following general formula [VII] or [VIII]

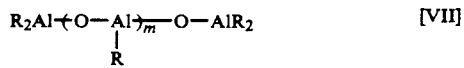

[VII]

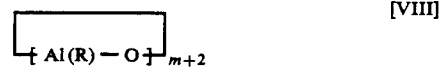

[VIII]

wherein R represents a hydrocarbon group such as a methyl, ethyl, n-propyl, isopropyl, n-butyl or isobutyl group, preferably the methyl, ethyl or isobutyl group, especially preferably the methyl group, m is an integer of 2 or more, preferably 5 or more.

The aluminoxane may be produced, for example, by the following method (1) or (2).

The aluminoxane of general formula [VII] or [VIII] may be formed of mixed oxyaluminum units

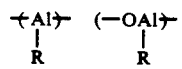

having different hydrocarbon groups. In this case, the aluminoxane preferably has at least an oxymethyl aluminum unit

in a proportion of at least 30 mole%, preferably at least 50 mole%, especially preferably at least 70 mole%.

(1) A trialkyl aluminum or a mixture of at least two trialkyl aluminums is added to, and reacted with, a suspension of a compound containing water of adsorption or a salt containing water of crystallization, such as magnesium chloride hydrate, copper sulfate hydrate, aluminum sulfate hydrate, nickel sulfate hydrate or cerous chloride hydrate in a hydrocarbon medium.

(2) Water is caused to act directly upon a trialkyl aluminum or a mixture of at least two trialkyl aluminums in a medium such as benzene, toluene, ethyl ether or tetrahydrofuran.

The method (1) is preferred. The aluminoxane may permissibly contain small amounts of organometallic components.

The catalyst ingredient (A) or catalyst ingredients (A) and (B) may be used as supported on a carrier. The carrier may be, for example, an inorganic compound such as silica or alumina, or an organic polymeric compound such as polyethylene or polypropylene.

It has been found in accordance with this invention that by copolymerizing the $C_3$–$C_{20}$ alpha-olefin with the cyclo-olefin in specific proportions using the above catalyst system, a copolymer having properties not hitherto proposed can be obtained. This copolymerization may be carried out in a liquid phase or in a vapor phase, preferably in the liquid phase. Copolymerization in the liquid phase is usually carried out in a hydrocarbon medium. Examples of the hydrocarbon medium are aliphatic hydrocarbons such as butane, isobutane, pentane, hexane, octane, decane, dodecane, hexadecane and octadecane, alicyclic hydrocarbons such as cyclopentane, methylcyclopentane, cyclohexane and cyclooctane, aromatic hydrocarbons such as benzene, toluene and xylene, and petroleum fractions such as gasoline, kerosene and light oil. The starting olefin may also be used as the hydrocarbon medium. The aromatic hydrocarbons are especially preferred as the hydrocarbon medium.

The temperature in the polymerization reaction in the process of this invention is usually −50° to 230° C., preferably −30° to 200° C.

The proportion of the zirconium compound used in carrying out the process of this invention in the liquid phase is usually $10^{-8}$ to $10^{-2}$ gram-atom/l, preferably $10^{-7}$ to $10^{-3}$ gram-atom/l, as the concentration of the zirconium atom in the polymerization reaction system. The proportion of the aluminoxane is usually $10^{-4}$ to $10^{-1}$ gram-atom/l, preferably $10^{-3}$ to $5\times10^{-2}$ gram-atom/l, as the concentration of the aluminum atom in the polymerization reaction system. The ratio of the aluminum atom to the transition metal atom in the polymerization system is usually from 4 to $10^7$, preferably from 10 to $10^6$. The molecular weight of the copolymer can be adjusted by using hydrogen, and/or adjusting the polymerization temperature.

The present inventors also made investigations for a novel olefinic random copolymer which has excellent transparency, thermal stability, heat aging resistance, chemical resistance, solvent resistance, dielectric properties and mechanical properties and a narrow molecular weight distribution and a narrow composition distribution, possesses excellent thermal stability even when its cyclo-olefin content is small, and which has a carbon-carbon unsaturated bond capable of reacting with maleic anhydride or the like in its side chain and can be modified easily according to various purposes. These investigations have led to the discovery that a novel olefinic random copolymer can be obtained by copolymerizing an alpha-olefin having 3 to 20 carbon atoms and a cyclic polyene and as required, a cyclo-olefin in the presence of a catalyst formed from a zirconium catalyst and an aluminoxane under specific conditions.

Thus, according to another aspect of this invention there is provided an olefinic random copolymer composed of (A) an olefin component having 3 to 20 carbon atoms and (B) a cyclic polyene component and as required, (C) a cyclo-olefin component, (i) said copolymer containing 5 to 99 mole% of recurring units derived from said alpha-olefin component (A) having 3 to 20 carbon atoms and 1 to 95 mole% of recurring units derived from said cyclic polyene component (B) and 0 to 90 mole% of recurring units derived from said cyclo-olefin component (C), and (ii) said copolymer having an intrinsic viscosity [η], measured in decalin at 135° C., of from 0.01 to 10 dl/g.

The olefinic random copolymer in this embodiment is composed of (A) an alpha-olefin component having 3 to 20 carbon atoms and (B) a cyclic polyene and as required, (C) a cyclo-olefin component. The cyclo-olefin component (C) is the same cyclo-olefin component of general formula [I], [II] or [III] given hereinabove. As in the aforesaid cyclo-olefinic random copolymer, the cyclo-olefin component forms the structure represented by general formula [IV], [V] or [VI] given hereinabove.

Specific examples of the alpha-olefin used as a starting material in the production of the olefinic random copolymer of this invention may be those given hereinabove.

Specific examples of the cyclic polyene (B) used as a starting material in the production of the olefinic random copolymer of this invention are 1,3-cyclopentadiene, 1,3-cyclohexadiene, 5-ethyl-1,3-cyclohexadiene, 1,3-cycloheptadiene, 1,3-cycloheptadiene, dicyclopentadiene, dicyclohexadiene, 5-ethylidene-2-norbornene, 5-methylene-2-norbornene, 5-vinyl-2-norbornene, 5-isopropylidene-2-norbornene, methylhydroindene, 2,3-diisopropylidene-5norbornene, 2-ethylidene-3-isopropylidene-5-norbornene, and 2-propenyl-2,5-norbornadiene.

The olefinic random copolymer of this invention contains 5 to 99 mole%, preferably 15 to 95 mole%, especially preferably 30 to 90 mole%, of recurring units derived from the alpha-olefin component (A), 1 to 95 mole%, preferably 5 to 85 mole%, especially preferably 10 to 70 mole%, of recurring units derived from the cyclo-olefin component (B), and 0 to 90 mole%, preferably 2 to 80 mole%, especially preferably 5 to 70 mole%, of recurring units derived from the cyclo-olefin component (C). These recurring units derived from the components (A), (B) and (C) are arranged at random to form a substantially linear olefinic random copolymer. That the olefinic random copolymer of this invention is substantially linear and has no gelled crosslinked structure can be ascertained from the fact that the copolymer completely dissolves in decalin at 135° C.

The intrinsic viscosity [η], measured in decalin at 135° C., of the olefinic random copolymer of this invention is 0.01 to 10 dl/g, preferably 0.05 to 7 dl/g, especially preferably 0.1 to 5 dl/g.

The molecular-weight distribution ($\overline{Mw}/\overline{Mn}$) of the olefinic random copolymer of this invention, measured by gel permeation chromatography (GPC), is usually not more than 4, preferably not more than 3.5, especially preferably not more than 3.

The olefinic random copolymer of this invention can be produced by polymerizing an alpha-olefin having 3 to 20 carbon atoms and the cyclic polyene and as required, a predetermined amount of the cyclo-olefin in the presence of a catalyst formed from (A) a zirconium compound having as a ligand at least two indenyl or substituted indenyl groups or partially hydrogenated groups thereof being bonded via an alkylene group such as an ethylene group, and (B) an aluminoxane.

Examples of the zirconium compound and the aluminoxane may be the same as given hereinabove with regard to the production of the cyclo-olefinic random copolymer.

The catalyst ingredient (A) or catalyst ingredients (A) and (B) may be used as supported on a carrier. Examples of the carrier are inorganic compounds such as silica and alumina and organic polymeric compounds such as polyethylene and polypropylene.

It has been found in accordance with this invention that by copolymerizing the $C_3$-$C_{20}$ alpha-olefin and the cyclic polyene and optionally the cyclo-olefin in specific proportions using the above catalyst system, a copolymer having properties not hitherto proposed can be obtained. This copolymerization may be carried out in a liquid phase or in a vapor phase, preferably in the liquid phase. Copolymerization in the liquid phase is usually carried out in a hydrocarbon medium. Examples of the hydrocarbon medium are aliphatic hydrocarbons such as butane, isobutane, pentane, hexane, octane, decane, dodecane, hexadecane and octadecane, alicyclic hydrocarbons such as cyclopentane, methylcyclopentane, cyclohexane and cyclooctane, aromatic hydrocarbons such as benzene, toluene and xylene, and petroleum fractions such as gasoline, kerosene and light oil. The starting olefin may also be used as the hydrocarbon medium. The aromatic hydrocarbons are especially preferred as the hydrocarbon medium.

The temperature in the polymerization reaction in the process of this invention is usually $-50°$ to $230°$ C., preferably $-30°$ to $200°$ C.

The proportion of the zirconium compound used in carrying out the process of this invention in the liquid phase is usually to $10^{-8}$ to $10^{-2}$ gram-atom/l, preferably $10^{-7}$ to $10^{-3}$ gram-atom/l, as the concentration of the zirconium atom in the polymerization reaction system. The proportion of the aluminoxane is usually $10^{-4}$ to $10^{-1}$ gram-atom/l, preferably $10^{-3}$ to $5 \times 10^{-2}$ gram-atom/l, as the concentration of the aluminum atom in the polymerization reaction system. The ratio of the aluminum atom to the transition metal atom in the polymerization system is usually from 4 to $10^7$, preferably from 10 to $10^6$. The molecular weight of the copolymer can be adjusted by using hydrogen, and/or adjusting the polymerization temperature.

The cyclo-olefinic random copolymer and the olefinic random copolymer provided by this invention have excellent transparency, thermal stability, heat aging resistance, chemical resistance, solvent resistance, dielectric properties and mechanical properties and a narrow molecular weight distribution and a narrow composition distribution, and possess excellent homogeneity. Because of their excellent properties, they find a wide variety of applications. For example, those having a low molecular weight can be used as synthetic waxes in candles, impregnants for match splints, paper treating agents, sizes, rubber antioxidants, water-proofing agents for corrugated boards, agents for retarding the effect of chemical fertilizers, heat storing agents, binders for ceramics, paper capacitors, electrical insulators for electrical wires and cables, neutron decelerating agents, textile treating aids, water-repellents for building materials, protective agents for paint coatings, lusterants, thixotropy-imparting agents, agents for imparting hardening to the cores of pencils and crayons, carbon ink bases, electrophotographic toners, lubricants and mold releasing agents for molding of synthetic resins, resin coloring agents, hot-melt adhesives and lubricating greases. Those having a high molecular-weight are useful in optical applications as optical lenses, optical discs, optical fibers and windowpanes, electrical applications as water tanks for electrical irons, electric ovens, base plates for liquid crystal display, printed circuit boards, high-frequency circuit boards, and transparent conductive sheets or films, medical applications as injecting syringes, pipettes and animal gages, chemical applications or in other fields as housings of various measuring instruments, camera bodies, films, and helmets.

Those containing not more than about 20 mole% of recurring units from the cyclo-olefin component may be used in fields where their shape memorizing property is utilized, such as vibration controlling materials or tubes. Specifically, they may be used as joints of irregularly-shaped pipes, laminating materials for the inside and outside parts of pipes and rods, clamping pins for optical fiber connectors, plaster bandages, containers, automobile bumpers, various space blocking materials, and vibration control materials (soundproof materials) or medical tubes in the form of laminates with metallic surface materials.

The novel olefinic random copolymer of this invention can be easily cured or modified since it contains a carbon-carbon unsaturated bond in its side chain.

In the field of producing cyclo-olefinic copolymers, it has been strongly desired to develop a process which can produce cyclo-olefinic copolymers having a narrow molecular weight distribution efficiently with a high copolymerizing efficiency of cyclo-olefins and excellent polymerization activity. The present inventors recognized that the prior art in the field of producing cyclo-olefinic copolymers was as stated above, and worked on a process which can produce a cyclo-olefinic copolymer having a narrow molecular weight distribution with a high copolymerization efficiency of the cyclo-olefin and excellent polymerization activity. This work has now led to the discovery that the aforesaid object can be achieved by copolymerizing an alpha-olefin and a cyclo-olefin in the presence of a catalyst composed of a compound of a transition metal of Group IVB of the periodic table having a specific coordination compound as a ligand and an aluminoxane.

Thus, according to still another aspect of this invention, there is provided a process for producing a cyclo-olefinic random copolymer, which comprises copolymerizing an alpha-olefin and a cyclo-olefin in the presence of a catalyst formed from (A) a compound of a transition metal of Group IVB of the periodic table having as a ligand a multidendate coordination compound in which at least two conjugated cycloalkadienyl groups or substituted products thereof are bonded via a lower alkylene group, and (B) an aluminoxane.

The catalyst used in the process of this invention is formed from (A) a compound of a transition metal of Group IVB of the periodic table and (B) an aluminoxane.

The transition metal compound (A) used as a catalyst ingredient in the process of this invention is a compound of a transition metal of Group IVB of the periodic table which has as a ligand a multidentate coordination compound in which at least two conjugated cycloalkadienyl groups or substituted groups thereof are bonded via a lower alkylene group. The compound of the transition metal of Group IVB of the periodic table are selected from titanium, zirconium and hafnium compounds. Titanium and zirconium are preferred as the transition metal in the catalyst ingredient (A), zirconium being especially preferred.

For example, the Group IVB transition metal compound (A) is represented by the following general formula [IX]

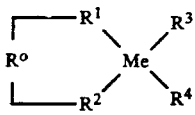

wherein $R^0$ represents a lower alkylene group, and $R^1$ and $R^2$ represent a conjugated cycloalkadienyl group or a substituted group thereof, $R^3$ and $R^4$ represent a cyclosubstituted alkadienyl group, an aryl group, an alkyl group, an aralkyl group, a cycloalkyl group, a halogen atom, a hydrogen atom, $OR^a$, $SR^b$, $NR_2^c$, or $R_2^d$, $R^a$, $R^b$, $R^c$ and $R^d$ represents a hydrocarbon group such as an alkyl, cycloalkyl, aryl or aralkyl group, or a silyl group, and the $R^c$ groups and $R^d$ groups may be linked to form a ring.

The lower alkylene group may be, for example, a methylene, ethylene, propylene or butylene group. Examples of the conjugated cycloalkadienyl group include a cyclopentadienyl group, a methylcyclopentadienyl group, an ethylcyclopentadienyl group, a dimethylcyclopentadienyl group, an indenyl group, a tetrahydroindenyl group, and a fluorenyl group. Examples of the alkyl group are methyl, ethyl, propyl, isopropyl, butyl, hexyl, octyl, 2-ethylhexyl, decyl and oleyl groups. The aryl group may be, for example, a phenyl or tolyl group. The aralkyl groups may be, for example, a benzyl or neophyl group. Examples of the cycloalkyl group include cyclopentyl, cyclohexyl, cyclooctyl, norbornyl and bicyclononyl groups and alkylsubstituted groups thereof. The hydrocarbon group may also include unsaturated aliphatic groups such as vinyl, allyl, propenyl, isopropenyl and 1-butenyl groups, and unsaturated alicyclic groups such as a cyclohexenyl group. The halogen atom may be for example fluorine, chlorine or bromine.

The zirconium compounds include, for example, the indenyl-type zirconium compounds exemplified hereinabove, and the following compounds.
Ethylenebis(cyclopentadienyl)zirconium monochloride monohydride,
ethylenebis(cyclopentadienyl)zirconium dichloride,
ethylenebis(cyclopentadienyl)methylzirconium monochloride,
ethylenebis(cyclopentadienyl)dimethylzirconium,
ethylenebis(cyclopentadienyl)diphenylzirconium,
methylenebis(cyclopentadienyl)zirconium dichloride,
methylenebis(cyclopentadienyl)dimethylzirconium,
propylenebis(cyclopentadienyl)zirconium dichloride,
ethylenebis(fluorenyl)zirconium dichloride,
ethylenebis(fluorenyl)dimethylzirconium,
ethylenebis(fluorenyl)diphenylzirconium,
methylenebis(fluorenyl)zirconium dichloride,
methylenebis(fluorenyl)dimethylzirconium, and
propylenebis(fluorenyl)zirconium dichloride.

Examples of the titanium compounds include
ethylenebis(indenyl)titanium dichloride,
ethylenebis(4,5,6,7-tetrahydro-1-indenyl)titanium dichloride,
ethylenebis(cyclopentadienyl)titanium dichloride,
methylenebis(cyclopentadienyl)titanium dichloride,
propylenebis(cyclopentadienyl)titanium dichloride,
methylenebis(indenyl)titanium dichloride,
methylenebis(4,5,6,7-tetrahydro-1-indenyl)titanium dichloride,
propylenebis(indenyl)titanium dichloride,
ethylenebis(fluorenyl)titanium dichloride, and
propylenebis(fluorenyl)titanium dichloride.

Examples of the hafnium compounds include the following compounds.
Ethylenebis(cyclopentadienyl)hafnium dichloride,
methylenebis(cyclopentadienyl)hafnium dichloride,
propylenebis(cyclopentadienyl)hafnium dichloride,
methylenebis(4,5,6,7-tetrahydro-1-indenyl)hafnium dichloride,
propylenebis(indenyl)hafnium dichloride,
ethylenebis(indenyl)hafnium dichloride, and
ethylenebis(4,5,6,7-tetrahydro-1-indenyl)hafnium dichloride.

The aluminoxane used as the catalyst ingredient (B) may be, for example, the organoaluminum compounds of general formulae [VII] and [VIII] which are exemplified hereinabove.

The catalyst ingredient (A) or the catalyst ingredients (A) and (B) may be used as supported on a carrier. The carrier may be, for example, an inorganic compound such as silica or alumina, or an organic polymeric compound such as polyethylene or polypropylene.

Specific examples of $C_2$–$C_{20}$ alpha-olefins which are used in the polymerization reaction in accordance with the process of this invention include, ethylene, propylene, 1-butene, 1-hexene, 4-methyl-1-pentene, 1-octene, 1-decene, 1-octadecene and 1-eicosene.

Specific examples of the cyclo-olefin to be supplied to the polymerization reaction in accordance with the process of this invention include cyclic monoenes, for example monocycloalkenes such as cyclopropene, cyclobutene, cyclopentene, cyclohexene, 3-methylcyclohexene, cycloheptene, cyclooctene, cyclodecene, cyclododecene, tetracyclodecene, octacyclodecene and cycloeicosene, bicycloalkenes such as norbornene, 5-methyl-2-norbornene, 5-ethyl-2-norbornene, 5-isobutyl-2-norbornene, 5,6-dimethyl-2-norbornene, and 5,5,6-trimethyl-2-norbornene, tricycloalkenes such as 2,3,3a,7a-tetrahydro-4,7-methano-1H-indene and 3a,5,6,7a-tetrahydro-4,7-methano-1H-indene, tetracycloalkenes such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl- 1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, and 2,3-dichloro-1,4,5,8-dimethano-1,2,3,4,4a,5,8,,8a-octahydronaphthalene; polycycloalkenes such as hexacyclo[6,6,1,1$^{3,6}$,1$^{10,13}$,0$^{2,7}$,0$^{9,14}$]-heptadecene-4, pentacyclo[8,8,1$^{2,9}$,1$^{4,7}$,1$^{11,18}$,0,0$^{3,8}$,0$^{12,17}$]heneicosene-5, otacyclo[8,8,1$^{2,9}$,1$^{4,7}$,1$^{11,18}$,1$^{13,16}$,0,0$^{3,8}$,0$^{12,17}$]decocene-5; and cyclic polyenes such as dicyclopentadiene, 5-methylene-2-norbornene, 5-ethylidene-2-norbornene, 1,5-cyclooctadiene, 5,8-endomethylenehexahydronaphthalene and alkylidenetetrahydroindenes.

In the process of this invention, a mixture of the alpha-olefin and the cyclo-olefin is fed into the polymerization reaction system as a starting material. The content of the alpha-olefin in the mixture is usually 1 to 90 mole%, preferably 2 to 80 mole%, and the content of the cyclo-olefin is usually 10 to 99 mole%, preferably 20 to 98 mole%.

In the process of this invention, the polymerization is usually carried out in a hydrocarbon medium. Examples of the hydrocarbon medium are aliphatic hydrocarbons such as butane, isobutane, pentane, hexane, octane, decane, dodecane, hexadecane and octadecane, alicyclic hydrocarbons such as cyclopentane, methylcyclopentane, cyclohexane and cyclooctane, aromatic hydrocarbons such as benzene, toluene and xylene, and petroleum fractions such as gasoline, kerosene and light oil. The starting olefin may also be used as the hydrocarbon medium. The aromatic hydrocarbons are especially preferred as the hydrocarbon medium.

In the process of this invention, a liquid phase polymerization method such as suspension polymerization and solution polymerization and a vapor-phase polymerization method are usually employed. The temperature in the polymerization reaction is usually $-50°$ to $230°$ C., preferably $-30°$ to $200°$ C.

The proportion of the transition metal compound used in carrying out the process of this invention in the liquid phase is usually to $10^{-8}$ to $10^{-2}$ gram-atom/l, preferably $10^{-7}$ to $10^{-3}$ gram-atom/l, as the concentration of the transition metal atom in the polymerization reaction system. The proportion of the aluminoxane is usually $10^{-4}$ to $10^{-1}$ gram-atom/l, preferably $10^3$ to $5 \times 10^{-2}$ gram-atom/l, as the concentration of the aluminum atom in the polymerization reaction system. The ratio of the aluminum atom to the transiton metal atom in the polymerization system is usually from 4 to $10^7$, preferably from 10 to $10^6$. The molecular weight of the copolymer can be adjusted by using hydrogen, and/or adjusting the polymerization temperature.

In the process of this invention, a cyclo-olefinic copolymer is obtained by working up the polymerization reaction mixture after the polymerization reaction by conventional methods. The resulting cyclo-olefinic copolymer is usually composed of 20 to 99.9 mole%, preferably 30 to 99.5 mole%, of the alpha-olefin component and 0.1 to 80 mole%, preferably 0.5 to 70 mole%, of the cyclo-olefin component. The intrinsic viscosity [η], measured in decalin at $135°$ C., of the cyclo-olefinc copolymer is usually 0.005 to 20 dl/g, preferably 0.01 to dl/g. Its molecular weight distribution measured by gel permeation chromatography is usually not more than 3, preferably not more than 2.5.

The process of this invention can produce a cyclo-olefinic random copolymer having a narrow molecular weight distribution with excellent polymerization activity.

The following examples specifically illustrate the cyclo-olefinic random copolymer and the olefinic random copolymer of this invention.

The properties of the copolymers obtained in the following examples were measured by the following methods.

Copolymer composition (mole%)

The content of units derived from the cyclo-olefin component in the copolymer was measured by $^{13}$C-NMR (200 megahertz).

Intrinsic viscosity [η]

Measured by an Ubbelohde viscometer at $135°$ C.

Molecular weight distribution ($\overline{Mw}/\overline{Mn}$)

Measured by the GPC method.

Glass transition temperature (TG)

Measured by a dynamic mechanical analyzer (DMA) (made by E. I. du Pont de Nemours & Co.).

EXAMPLE 1

Preparation of ethylenebis(indenyl)zirconium dichloride

Tetrahydrofuran (60 ml) was fed into a 200 ml fully nitrogen-purged glass flask, and then cooled to $-78°$ C. Zirconium tetrachloride (4.9 g) was introduced into the flask. The mixture was gradually heated to $60°$ C. and stirred for 1 hour at this temperature to form a solution. Subsequently, a solution of 21 millimoles of bis(indenyl)ethane lithium salt in 50 ml of tetrahydrofuran was added, and the mixture was stirred at $60°$ C. for 1 hour. The mixture was further stirred for 12 hours at $25°$ C. Under reduced pressure, tetrahyrofuran was removed to form a solid. The solid was washed with methanol, and dried under reduced pressure to give 2.1 g of ethylenebis(indenyl)zirconium dichloride.

Preparation of an aluminoxane $Al_2(SO_4)_3 \cdot 14H_2O$ (37 g) and 125 ml of toluene were introduced into a 400 ml fully nitrogen-purged flask, and cooled to $0°$ C. Trimethyl aluminum (500 millimoles) diluted with 125 ml of toluene was added dropwise. The mixture was heated to $40°$ C., and treated at this temperature for 10 hours. After the reaction, the reaction mixture was filtered. By removing toluene from the filtrate, 13 g of aluminoxane as a white solid was obtained. The aluminoxane had a molecular weight of 930 when it was determined by freezing point depression in benzene. The m value of the aluminoxane in the catalyst ingredient (B) was 14. For polymerization, the aluminoxane was used as a solution in toluene.

Polymerization

A 1000 ml fully nitrogen-purged glass autoclave was charged with 500 ml of purified toluene and 15 g of tetracyclododecene, and propylene gas was passed through it at a rate of 60 liters/hr. The flask was maintained at $20°$ C. for 10 minutes. Subsequently, 5 mg-atom as the aluminum atom of the aluminoxne and $0.5 \times 10^{-2}$ mg/atom, as the zirconium atom, of ethylenebis(indenyl)zirconium dichloride in toluene were introduced into the autoclave, and the polymerization was started. The polymerization was carried out at 20° C. for 2 hours under atmospheric pressure, and then stopped by adding isopropanol. The polymerization proceeded in a homogeneous solution, and after the 2-hour polymerization, absorption of propylene was observed. The polymer solution was added to a large amount of a mixture of methanol and acetone to precipitate the polymer. The polymer was dried overnight under reduced pressure at 120° C. After drying, the amount of the copolymer yielded was 6.1 g. The activity per unit amount of zirconium was 60 g of polymer/mg Zr atom-hr. The resulting copolymer contained 75 mole% of propylene, and had an intrinsic viscosity [$\eta$] of 0.09 dl/g, a molecular weight distribution of 1.48, and a glass transition temperature of 78° C.

EXAMPLES 2-9

Example 1 was repeated except that the copolymerization conditions indicated in Table 3 were employed. The properties of the resulting polymers are also shown in Table 3.

passed through it at a rate of 60 liters/hr. The flask was maintained at 20° C. for 10 minutes. Subsequently, 5 mg-atom as the aluminum atom of the aluminoxane and $0.5 \times 10^{-2}$ mg-atom, as the zirconium atom, of ethylenebis(indenyl)zirconium dichloride dissolved in toluene were introduced into the autoclave, and the polymerization was started. The polymerization was carried out at 20° C. for 4 hours under atmospheric pressure, and then stopped by adding isopropanol. The polymerization proceeded in a homogeneous solution, and after the 4-hour polymerization, absorption of propylene was observed. The polymer solution was added to a large amount of a mixture of methanol and acetone to precipitate the polymer. The polymer was dried overnight under reduced pressure at 120° C. After drying, the amount of the copolymer yielded was 2.2 g. The resulting copolymer contained 66 mole% of propylene, and had an intrinsic viscosity [$\eta$] 0.16 dl/g, and a molecular weight distribution of 1.41.

EXAMPLES 11-17

Example 10 was repeated except that the copolymerization conditions indicated in Table 4 were employed. The properties of the resulting polymers are also shown in Table 4.

TABLE 3

| | Copolymerization conditions | | | | | Properties of the polymer | | | | |
|---|---|---|---|---|---|---|---|---|---|---|
| | Cyclo-olefin (*3) | | α-olefin (*4) | | Polymerization temperature (°C.) | Polymerization time (hr) | Amount yielded (g) | α-olefin content (mole %) | [$\eta$] (dl/g) | $\overline{Mw}/\overline{Mn}$ | Tg (°C.) |
| Example | Name | Concentration in the reactor (g/l) | Name | Concentration in the reactor (g/l) | | | | | | | |
| 1 | TD | 30 | Propylene | 60 | 20 | 2 | 6.1 | 75 | 0.09 | 1.48 | 78 |
| 2 (*1) | " | " | " | " | " | 4 | 1.4 | 70 | 0.07 | 1.44 | 95 |
| 3 (*2) | " | " | " | " | " | 2 | 2.2 | 65 | 0.07 | 1.44 | 123 |
| 4 | " | " | " | " | 0 | " | 1.1 | 72 | 0.20 | 1.46 | 89 |
| 5 | " | " | " | " | 50 | " | 34.4 | 77 | 0.11 | 1.52 | 67 |
| 6 | MTD | " | " | " | 20 | " | 5.4 | 76 | 0.11 | 1.45 | 81 |
| 7 | NB | " | " | " | " | 4 | 3.6 | 56 | 0.15 | 1.40 | 110 |
| 8 | MNB | " | " | " | " | " | 3.2 | 51 | 0.19 | 1.44 | 113 |
| 9 | " | " | 4MP-1 | 0.5 (l/l) | " | 3 | 0.6 | 97 | 0.13 | 1.30 | 84 |

Note:
The concentration of Et(Ind)$_2$ ZrCl$_2$ was adjusted to 0.1 mM/l and the concentration of methylaluminoxane, to 10.0 mM/l.
(*1): The amount of N$_2$ fed was adjusted to 180 liters/hr.
(*2): The amount of N$_2$ fed was adjusted to 60 liters/hr.
(*3): TD = tetracyclododecene, MTD = 2-methyl-1,4,5,8-dimethano-1,2,3,4,4a,5,8,8a-octahydronaphthalene, NB = norbornene, MNB = 5-methyl-2-norbornene
(*4): 4MP-1 = 4-methyl-1-pentene

EXAMPLE 10

Polymerization

A 1000 ml fully nitrogen-purged glass autoclave was charged with 500 ml of purified toluene and 15 g of 5-ethylidene-2-norbornene, and propylene gas was

TABLE 4

| | Copolymerization conditions | | | | | | | Properties of the polymer | | | | |
|---|---|---|---|---|---|---|---|---|---|---|---|---|
| | Propylene | Cyclic polyene (*1) | | Cyclo-olefin (*2) | | Polymerization temperature (°C.) | Polymerization time (hr) | Amount yielded (g) | Cyclic polyene content (mole %) | cyclo-olefin content (mole %) | [$\eta$] (dl/g) | $\overline{Mw}/Mn$ |
| Example | Concentration in the reactor (g/hr) | Name | Concentration in the reactor (g/l) | Name | Concentration in the reactor (g/l) | | | | | | | |
| 10 | 60 | ENB | 30 | TD | 0 | 20 | 4 | 2.2 | 34 | 0 | 0.16 | 1.41 |
| 11 | " | " | " | " | 10 | " | " | 2.0 | 31 | 8 | 0.11 | 1.48 |
| 12 | " | " | " | " | 30 | " | " | 1.7 | 25 | 17 | 0.09 | 1.49 |
| 13 | " | " | " | NB | 10 | " | " | 2.1 | 29 | 11 | 0.14 | 1.45 |
| 14 | " | VNB | " | TD | 0 | " | " | 1.9 | 31 | 0 | 0.15 | 1.40 |
| 15 | " | " | " | " | 10 | " | " | 1.7 | 28 | 7 | 0.12 | 1.46 |
| 16 | " | " | " | " | 30 | " | " | 1.4 | 21 | 16 | 0.10 | 1.47 |
| 17 | " | " | " | NB | 10 | " | " | 1.8 | 28 | 13 | 0.13 | 1.43 |

Note:
The concentration of ET(Ind)$_2$ ZrCl$_2$ was adjusted to 0.1 mM/l and the concentration of methylaluminoxane, to 10.0 mM/l.
(*1): ENB = ethylidene-2-norbornene, VNB = 5-vinyl-2-norbornene
(*2): TD = tetracyclododecene, NB = norbornene

EXAMPLE 18

A 1000 ml fully nitrogen-purged glass autoclave was charged with 500 ml of purified toluene and 15 g of tetracyclododecene, and propylene gas was passed through it at a rate of 60 liters/hr. The flask was maintained at 20° C. for 10 minutes. Subsequently, 5 mg-atom as the aluminum atom of the aluminoxane and $0.5 \times 10^{-2}$ mg-atom, as the zirconium atom, of ethylenebis(indenyl)zirconium dichloride in toluene were introduced into the autoclave, and the polymerization was started. The polymerization was carried out at 20° C. for 2 hours under atmospheric pressure, and then stopped by adding isopropanol. The polymerization proceeded in a homogeneous solution, and after the 2-hour polymerization, absorption of propylene was observed. The polymer solution was added to a large amount of a mixture of methanol and acetone to precipitate the polymer. The polymer was dried overnight under reduced pressure at 120° C. After drying, the amount of the copolymer yielded was 6.1 g. The activity per unit amount of zirconium was 60 g of polymer/mg Zr atom-hr. The resulting copolymer contained 75 mole% of propylene, and had an intrinsic viscosity [η] of 0.09 dl/g and a molecular weight distribution of 1.48.

EXAMPLE 19

Example 25 was repeated except that the amount of purified toluene was changed to 250 ml, 15 g of 5-methyl-1-pentene was used instead of the tetracyclododecene and 250 ml of 4-methyl-1-pentene was used instead of propylene, and the polymerization was carried out at 20° C. for 3 hours. There was obtained 0.6 g of a copolymer having a 4-methyl-1-pentene content of 97 mole%, an intrinsic viscosity [η] of 0.13 dl/g and a molecular weight distribution of 1.30.

What we claim is:

1. A process for producing a cyclo-olefinic random copolymer, which comprises copolymerizing an alpha-olefin and a cyclo-olefin in the presence of a catalyst formed from
   (A) a compound of a transition metal of Group IVB of the periodic table having as a ligand a multidentate coordination compound in which at least two conjugated cycloalkadienyl groups or substituted products thereof are bonded via a lower alkylene group, and
   (B) an aluminoxane.

2. The process of claim 1 wherein the transition metal compound is a zirconium compound containing as a ligand at least two indenyl groups or substituted indenyl groups or partially hydrogenated groups thereof which are bonded via an alkylene group.

3. The process of claim 2 wherein the aluminoxane is an organoaluminum compound represented by the general formula

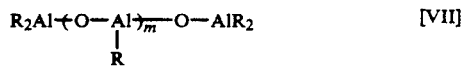 [VII]

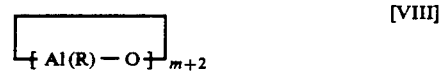 [VIII]

wherein R represents a hydrocarbon group, and m represents an integer of at least 2.

4. The process of claim 3 wherein R is a methyl, ethyl or isobutyl group, and m is an integer of at least 5.

5. The process of claim 3 wherein R is a methyl group and m is an integer of 5 to 50.

6. The process of claim 2 wherein the transition metal compound is ethylenebis(indenyl)zirconium dichloride.

7. The process of claim 3 wherein the alpha-olefin is selected from ethylene, propylene and 4-methyl-1-pentene, and the cyclo-olefin is selected from tetracyclododecene, 2-methyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 5-methyl-2-norbornene, norbornene and 5-ethylidene-2-norbornene.

8. The process of claim 4 wherein the alpha-olefin is selected from ethylene, propylene and 4-methyl-1-pentene, and the cyclo-olefin is selected from tetracyclododecene, 2-methyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 5-methyl-2-norbornene, norbornene and 5-ethylidene-2-norbornene.

9. The process of claim 6 wherein the alpha-olefin is selected from ethylene, propylene and 4-methyl-1-pentene, and the cyclo-olefin is selected from tetracyclododecene, 2-methyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 5-methyl-2-norbornene, norbornene and 5-ethylidene-2-norbornene.

* * * * *